(12) United States Patent
Bermudes

(10) Patent No.: US 10,836,653 B2
(45) Date of Patent: Nov. 17, 2020

(54) DEVICE AND METHOD FOR EXTRACTING SOLUBLE SUBSTANCES DISSOLVED IN AN AQUEOUS SOLUTION

(71) Applicant: Marc Bermudes, Sainte Marie (FR)

(72) Inventor: Marc Bermudes, Sainte Marie (FR)

(73) Assignee: Marc Bermudes, Sainte Marie (FR)

( * ) Notice: Subject to any disclaimer, the term of this patent is extended or adjusted under 35 U.S.C. 154(b) by 0 days.

(21) Appl. No.: 16/074,761

(22) PCT Filed: Feb. 3, 2017

(86) PCT No.: PCT/EP2017/052349
§ 371 (c)(1),
(2) Date: Aug. 1, 2018

(87) PCT Pub. No.: WO2017/134205
PCT Pub. Date: Aug. 10, 2017

(65) Prior Publication Data
US 2019/0031532 A1   Jan. 31, 2019

(30) Foreign Application Priority Data
Feb. 4, 2016   (FR) .................................... 16 50898

(51) Int. Cl.
*C02F 1/28* (2006.01)
*B01D 15/18* (2006.01)
*C02F 101/30* (2006.01)

(52) U.S. Cl.
CPC .............. *C02F 1/283* (2013.01); *B01D 15/18* (2013.01); *C02F 1/28* (2013.01);
(Continued)

(58) Field of Classification Search
CPC .... B01D 15/18; B01D 15/1807; B01D 23/14; B01D 24/007; B01D 24/12; B01D 24/22;
(Continued)

(56) References Cited

U.S. PATENT DOCUMENTS

| 130,316 A |   | 8/1872 | Robinson |   |
|---|---|---|---|---|
| 546,527 A | * | 9/1895 | Gudeman | .......... B01D 35/0276 210/336 |

(Continued)

FOREIGN PATENT DOCUMENTS

GB   2473872 A   3/2011

OTHER PUBLICATIONS

French Patent Application No. 16 50898, Rapport de Recherche Préliminaire, Jul. 15, 2016, 2 pages.
(Continued)

*Primary Examiner* — Matthew O Savage
(74) *Attorney, Agent, or Firm* — Soquel Group LLC

(57) ABSTRACT

A device for extracting soluble substances dissolved in an aqueous solution, the extraction device including a peripheral wall and an adsorbent agent contained in the peripheral wall, the adsorbent agent being capable of extracting at least one portion of the soluble substances by contact with the aqueous solution, the extraction device also including a maze, defining a circulation path for the aqueous solution within the peripheral wall, the maze including a main inlet and a main outlet of aqueous solution, in fluid communication with one another via the circulation path, the adsorbent agent being arranged inside the maze so as to be placed in contact with the aqueous solution during the circulation of the latter along the circulation path.

10 Claims, 9 Drawing Sheets

(52) U.S. Cl.
CPC .. *C02F 2101/306* (2013.01); *C02F 2201/007* (2013.01); *C02F 2301/028* (2013.01)

(58) Field of Classification Search
CPC . B01D 25/06; C02F 1/28; C02F 1/283; C02F 1/78; C02F 9/005; C02F 2003/003; C02F 2101/306; C02F 2201/007; C02F 2301/028
USPC .................. 210/283, 285, 286, 336, 337
See application file for complete search history.

(56) References Cited

U.S. PATENT DOCUMENTS

| | | | |
|---|---|---|---|
| 5,223,154 A * | 6/1993 | MacPherson, Jr. .. | B01D 24/002 210/790 |
| 5,552,043 A | 9/1996 | Noordhoff | |
| 6,582,595 B1 | 6/2003 | Peabody | |
| 2011/0024357 A1* | 2/2011 | De Vocht ............... | B01D 15/00 210/691 |
| 2015/0321927 A1 | 11/2015 | McWayne | |

OTHER PUBLICATIONS

International Application No. PCT/EP2017/052349, International Search Report, dated Mar. 6, 2017, 3 pages.

\* cited by examiner

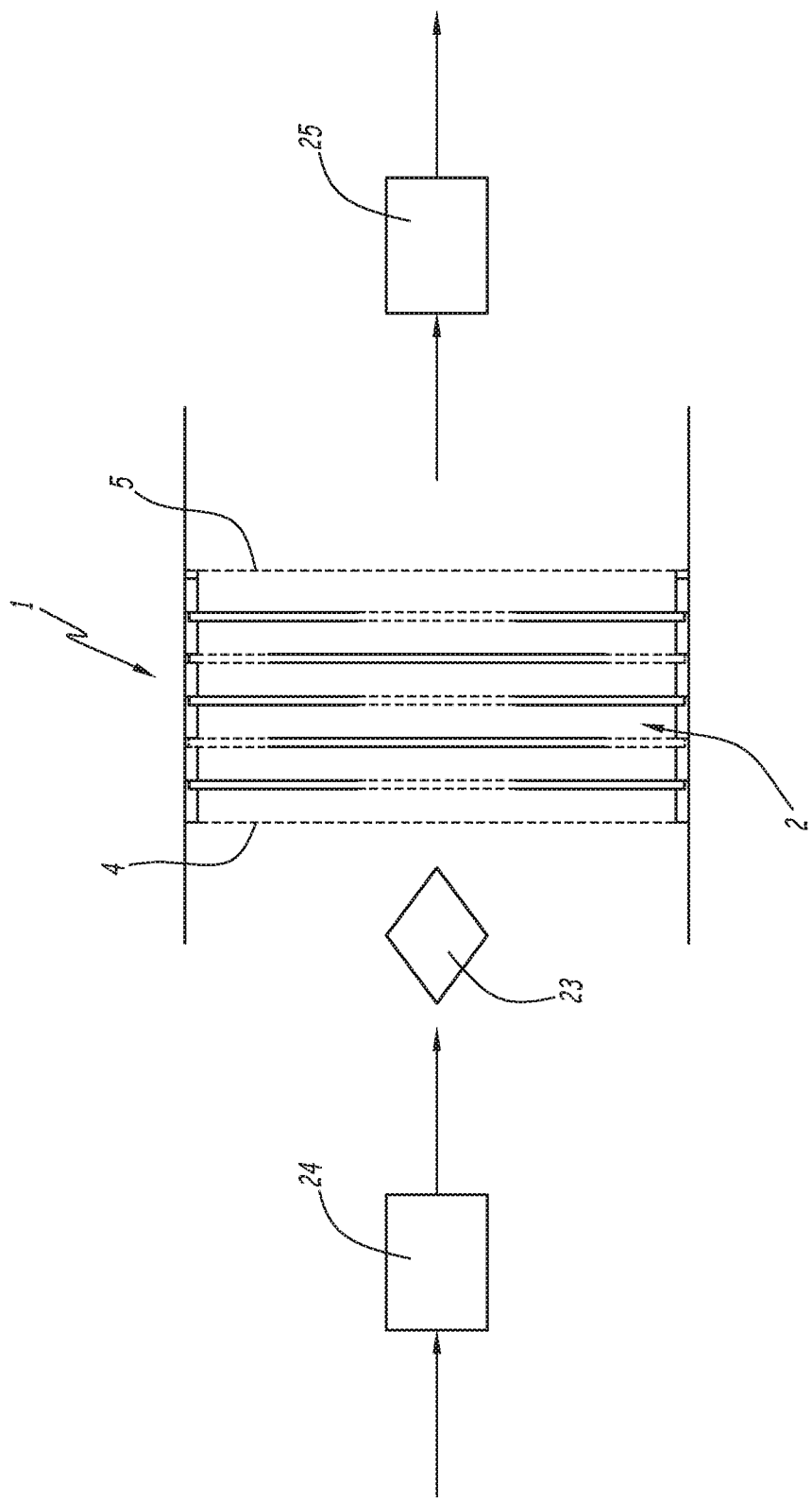

DEVICE AND METHOD FOR EXTRACTING SOLUBLE SUBSTANCES DISSOLVED IN AN AQUEOUS SOLUTION

CROSS REFERENCE TO RELATED APPLICATIONS

This application claims benefit under 35 USC § 371 of PCT Application No. PCT/EP2017/052349 entitled DEVICE AND METHOD FOR EXTRACTING SOLUBLE SUBSTANCES DISSOLVED IN AN AQUEOUS SOLUTION, filed on Feb. 3, 2017 by inventor Marc Bermudes. PCT Application No. PCT/EP2017/052349 claims priority benefit of French Patent Application No. 16 50898 filed on Feb. 4, 2016.

FIELD OF THE INVENTION

The present invention relates to a device and a method for extracting soluble substances dissolved in an aqueous solution. The present invention also relates to the use of this method in the pollution control of an aqueous solution for example constituting industrial or household wastewater.

BACKGROUND OF THE INVENTION

The topic of environmental pollution by dissolved substances such as organic micropollutants is not new. Organic micropollutants such as agricultural pesticides and other pharmaceutical and veterinary molecules have long been detected in wastewater. The implementation of various surveillance plans has made it possible to verify that this pollution has an impact on the flora, and more seriously on the fauna, with cases of endocrine disruptions, as well as on human health. The European authorities in this area have therefore issued a Water Framework Directive (Directive 2000/60/EC), under which the member states of the European Union must demonstrate a true desire to eliminate this pollution from water through various measures first seeking to establish and monitor sensitive sites, then subsequently to prohibit the production of certain molecules indicated on a "list of priority hazardous substances" (Directive 2013/39/EU by the European Parliament and the Council dated Aug. 12, 2013 modifying Directives 2000/60/EC and 2008/105/EC) and the detection of pollution at its source.

The treatment processes currently used in the Wastewater Treatment Stations (WTS) are recognized as ineffective in the context of organic micropollutants, as shown by the circular dated Sep. 29, 2010 relative to monitoring of the presence of micropollutants in wastewater in the natural environment by wastewater treatment stations. Therefore, new technologies have appeared, which are more or less efficient, more or less expensive and more or less sustainable. Among these new technologies, some produce from 15 to 20% concentrated waste, for example reverse osmosis, which makes it possible to deliver pure water, but which must be re-mineralized, active sludge, which requires an incineration step, or frontal filtration. Other physicochemical technologies use a catalyzed ultraviolet reaction such as photo-oxidation using a metal molecule-based catalyst, for example titanium dioxide, which is subsequently extracted from the medium using filtration or flotation, or ozonation, which can generate one or several products derived from the degradation of the organic micropollutants that are most dangerous to the environment and health. Other, more sustainable new technologies such as enzymatic extractions are appearing and yielding interesting results, but are more complicated to monitor and dimension on WTSs. Other technologies also consist of the genetic modification of bacteria having a pollutant retention capacity, but these technologies are problematic from an ethical standpoint.

Known from FR 2,914,296 is the use, in aquaculture, of an aqueous effluent treatment method comprising a step for extracting at least one dissolved gaseous compound, implementing the injection of a gaseous phase in an aqueous effluent column.

Also known from FR 2,952,370 is a method for recovering inert or live microparticles with a size comprised between 0.5 and 60 microns in the aqueous effluents, such as bacterial influxes, colloids, inert residual particles such as mud, silica or clay, in which a gaseous phase is injected in an aqueous effluent column. The injection of the gaseous phase into the aqueous effluent at the foot of the column makes it possible to obtain, at the head of the column, a foam comprising a polyphase mixture of the aqueous effluent and the gaseous phase enriched with inert or live microparticles.

Nevertheless, these methods are not suitable for extracting substances dissolved in large quantities of aqueous solution.

Lastly, known from FR 2,946,333 is a water treatment installation for the potabilization thereof, the installation comprising a single reactor within which the aqueous fluid is placed in contact with a coagulated and flocculated activated carbon fluidized bed.

However, this type of reactor is not suitable for treating aqueous solutions with particularly variable and heterogeneous pollutant concentrations.

In light of the environmental issues in the coming years, there is a need to carry out a method allowing an effective extraction of the soluble pollutants dissolved in the aqueous solutions, while not producing additional nonrecyclable waste.

SUMMARY OF THE DESCRIPTION

The invention therefore aims to provide a device for extracting soluble substances dissolved in an aqueous solution that is particularly effective, while being particularly compact.

The invention also aims to provide an extraction device that is particularly versatile and adaptable to aqueous solutions with highly diverse compositions.

The invention also aims to provide an extraction device that respects the environment, which does not generate nonrecyclable waste.

The invention also aims to provide an extraction device that is inexpensive and easy to industrialize.

The invention also aims to provide an extraction device that is particularly easy to maintain.

The invention also aims to provide an extraction device, implemented with the extraction device, that is particularly effective.

The invention relates to a device for extracting soluble substances dissolved in an aqueous solution, the extraction device comprising a peripheral wall and an adsorbent agent contained in this peripheral wall, the adsorbent agent being capable of extracting at least one portion of the soluble substances by contact with the aqueous solution. According to the invention, the extraction device further comprises a maze, defining a circulation path for the aqueous solution within the peripheral wall, the maze comprising a main inlet and a main outlet for the aqueous solution that are fluidly connected to one another by the circulation path, the adsorbent agent being arranged inside the maze so as to be placed in contact with the aqueous solution during the circulation of the latter along the circulation path.

Owing to the invention, the contact time between the aqueous solution is particularly high, without the compactness of the device being too great. As a result, the device is particularly effective for extracting the soluble substances from the aqueous solution.

According to other advantageous features of the invention, considered alone or in combination:

- the maze further comprises a modular assembly of several removable modules, each removable module being able to be assembled to, or disassembled from, the modular assembly in order to modify the circulation path;
- a first portion of the removable modules are wall modules, together forming a portion at least of the peripheral wall when the wall modules are mounted within the modular assembly;
- a first wall module, from among the wall modules, defines an upper annular edge on which a second wall module, from among the wall modules, is able to be assembled, via a lower annular edge defined by the second wall module;
- a second portion of the removable modules are partition modules, each partition module comprising at least one transverse partition housed inside the peripheral wall when the partition module is mounted within the modular assembly, so as to at least partially close a transverse section of the peripheral wall, at least one passage opening for the aqueous solution being arranged through the transverse partition;
- the passage opening of a first partition module, among the partition modules, is offset relative to the passage opening of a second partition module, among the partition modules, when the first partition module and the second partition module are assembled within the modular assembly;
- each partition module is designed to be inserted between the lower annular edge and the upper annular edge;
- at least a first portion of the adsorbent agent and a second portion of the adsorbent agent are separated by one of the partition modules, the first portion of the adsorbent agent having a particle size with a first mean value, the second portion of the adsorbent agent having a particle size with a second mean value, different from the first mean value;
- at least a majority of the mass of the adsorbent agent is made up of granular and/or powdered activated carbon;
- the extraction device comprises at least one bubbler, which is intended to generate a stream of bubbles in the aqueous solution circulating in the maze, in a circulation direction oriented from the main inlet toward the main outlet or from the main outlet toward the main inlet; and
- the extraction device comprises a pressurizing device, or a depressurizing device, for the aqueous solution in the maze.

The invention also relates to a method for extracting soluble substances dissolved in an aqueous solution. The extraction method is carried out using an extraction device according to the preceding.

Advantageously, the method comprises a step in which at least one of the removable modules is assembled and/or disassembled based on at least one of the following elements: concentration in soluble substances dissolved in the aqueous solution intended to circulate in the maze, volume of aqueous solution intended to circulate in the maze, flow rate of aqueous solution intended to circulate in the maze.

The invention lastly relates to a use of a method according to the preceding in order to control pollution in an aqueous solution, for example making up industrial or household wastewater.

BRIEF DESCRIPTION OF THE DRAWINGS

The invention will be better understood upon reading the following description, given solely as a non-limiting and non-exhaustive example and done in reference to the drawings, in which:

FIG. 9 shows an embodiment of the extraction device arranged such that its main axis is not vertical

DETAILED DESCRIPTION

Hereinafter, the terms "top" and "upper" refer to a vertical direction oriented upward in FIGS. 1 to 3 and 6 to 8, the terms "bottom" and "lower" referring to an opposite direction.

Figure 1:
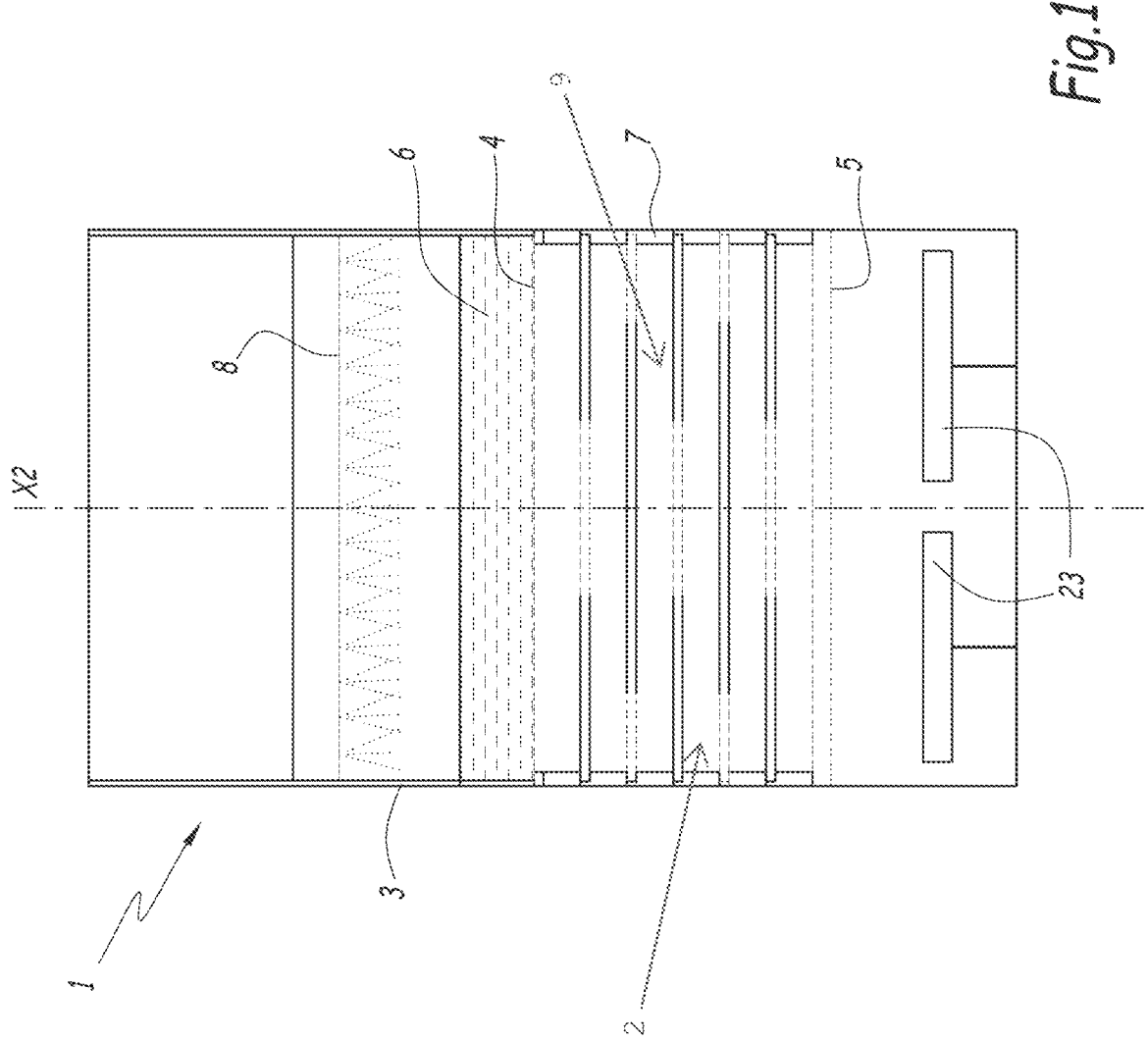
FIG. 1 is a longitudinal sectional view of a treatment installation comprising an extraction device according to a first embodiment of the invention.

The installation 1 for treating an aqueous solution illustrated in FIG. 1 includes the extraction device 2, mounted within a chamber 3 of the installation 1. An aqueous solution refers to any water containing dissolved soluble substances and/or polluted water, also called wastewater or sewage. The wastewater may in particular come from various sources, such as industrial wastewater in particular coming from industries in the chemical, agrochemical, electrical, electronic, metallurgical, pharmaceutical, etc. sectors, household wastewater, etc.

The device 2 forms a cartridge, in particular modular, that is inserted via an upper part of the chamber 3. This chamber 3 then surrounds a peripheral wall 7 of the device 2.

The device 2 is designed to extract soluble substances from the aqueous solution, when the latter is inserted into it via a main inlet 4, which is located in the upper part of the device 2. Preferably, the soluble substances are pollutants and/or unwanted dissolved substances and/or extractable dissolved substances. For example, the soluble substances are volatile substances and/or organic micropollutants chosen from among pharmaceutical compounds, veterinary compounds, pesticides or any combination thereof. Preferably, the organic micropollutants are chosen from among pharmaceutical compounds such as antibiotics, from among pesticides, or combinations thereof. Organic micropollutants preferably refer to synthetic chemical compounds that are not broken down via a natural mechanisms such as enzymatic degradation or that are broken down into chemical compounds more noxious than the original chemical compounds. For example, before it passes within the device 2, the aqueous solution has the following characteristics, attesting to the soluble substances that it contains:

7 mg/l of BDO5 (biochemical demand for oxygen, i.e., the quantity of oxygen necessary to oxidize the biodegradable organic materials biologically, after five days and at 20° C., in the dark), 30 mg/l of CDO (chemical demand for oxygen), and 14 mg/l de MIS (matter in suspension).

The device 2 is also able to extract the following soluble substances potentially contained in the aqueous solution:

| Class | Family | Molecule |
| --- | --- | --- |
| Pesticides | Carbamate | Carbofuran |
| | Organophosphates | Diazinon |
| | | Chlorpyrifos-Methyl |
| | | Ethorpophos |
| | | Chlorpyrifos |
| | | Chlorfenvinphos |
| | | Azinphos-Methyl |
| | | Azinphos-Ethyl |
| | Triazine | Atrazine |
| | | Desethyl Atrazine |
| | | Desisopropyl Atrazine |
| | | Terbuthylazine Desethyl |
| | | Simazine |
| | | Propazine |
| | | Cyanazine |
| | | Ametryn |
| | | Terbuthylazine |
| | Amines- | Oxadixyl |
| | amides, acetylamides | Metazachlor |
| | | Dimethachlor |
| | | Tebutam |
| | Substituted urea | Diuron |
| | | 1(3,4DCP)-3M U |
| | | Chlorotoluron |
| | | Isoproturon |
| | | Linuron |
| | | Monuron |
| | | Monolinuron |
| | | Metoxuron |
| | Triazinone | Hexazinone |
| | Triazole | Fenpropidin |
| | | Tebuconazole |
| | Diazine | Bromacil |
| | Oxadiazole derivatives | Oxadiazon |
| | Imidazole | Prochloraz |
| | Acylanine | Metalaxyl |
| | pyridazinones | Norflurazon |
| | pyrimidinamines | Cyprodinil |
| | benzamides | Propyzamide |
| | neonicotinoids | Imidacloprid |
| Antibiotics | Sulfamide | Sulfanilamide |
| | Amphenicols | Chloramphenicol |
| | Quinolones | Enrofloxacin |
| | Penicillins | Amoxicillin |
| | | Ampicillin |
| | Tetracycline | Tetracycline |

In practice, the installation 1 comprises an upper reservoir 6 for aqueous solution positioned above the main inlet 4, in order to supply the latter by gravity. In the scenario illustrated in FIGS. 1 and 2, the aqueous solution is at atmospheric pressure. The bottom of the reservoir 6 is preferably open over the entire surface of the main inlet 4. The reservoir 6 is in turn supplied in the upper part by a distribution trough 8, which pours aqueous solution in a distributed manner on the surface of the aqueous solution of the reservoir 6. The aqueous solution of the reservoir 6 is thus stirred little.

Figure 2:
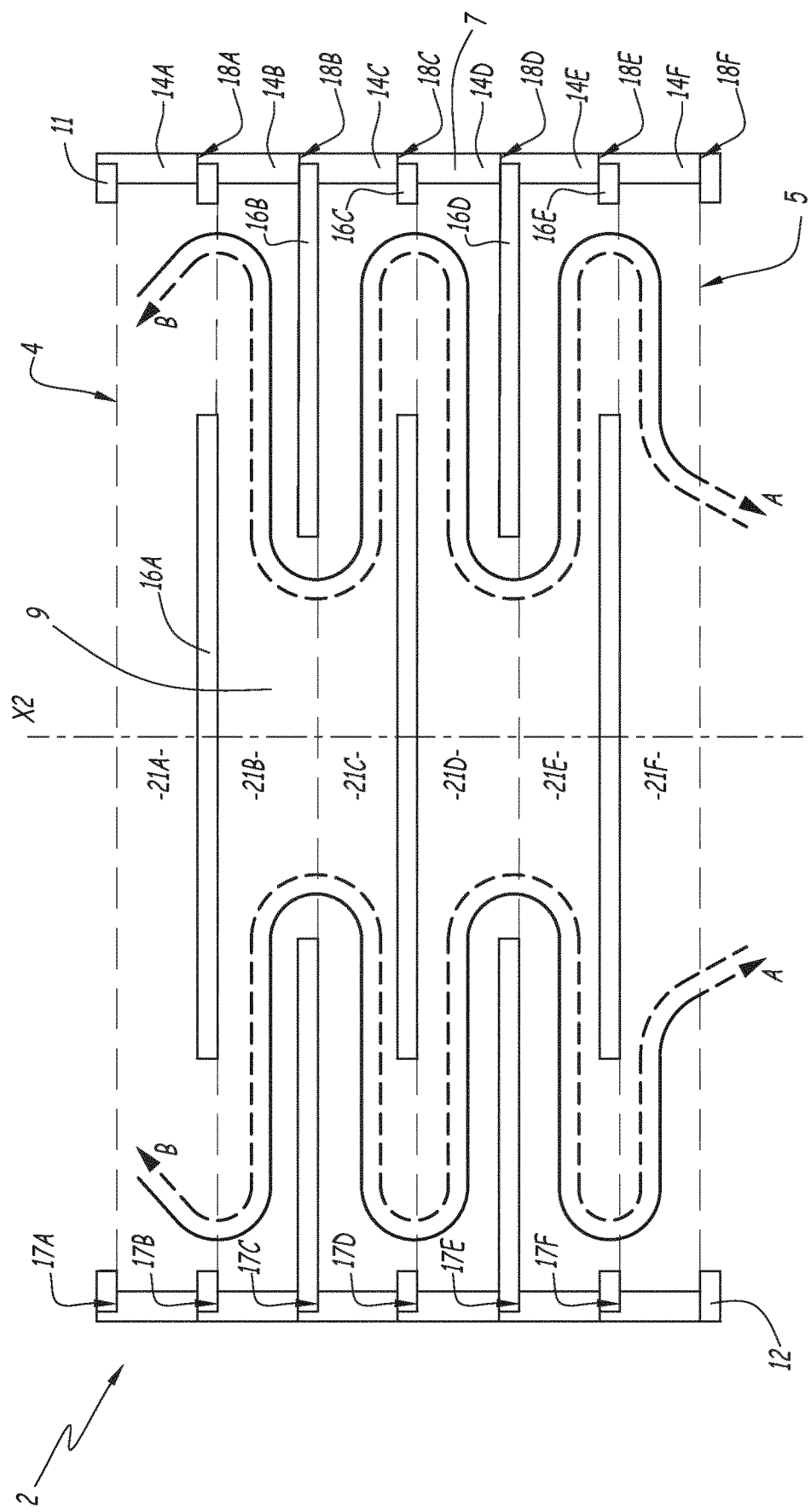
FIG. 2 is a longitudinal sectional view similar to that of FIG. 1, enlarged, of the extraction device of FIG. 1.
Figure 3:
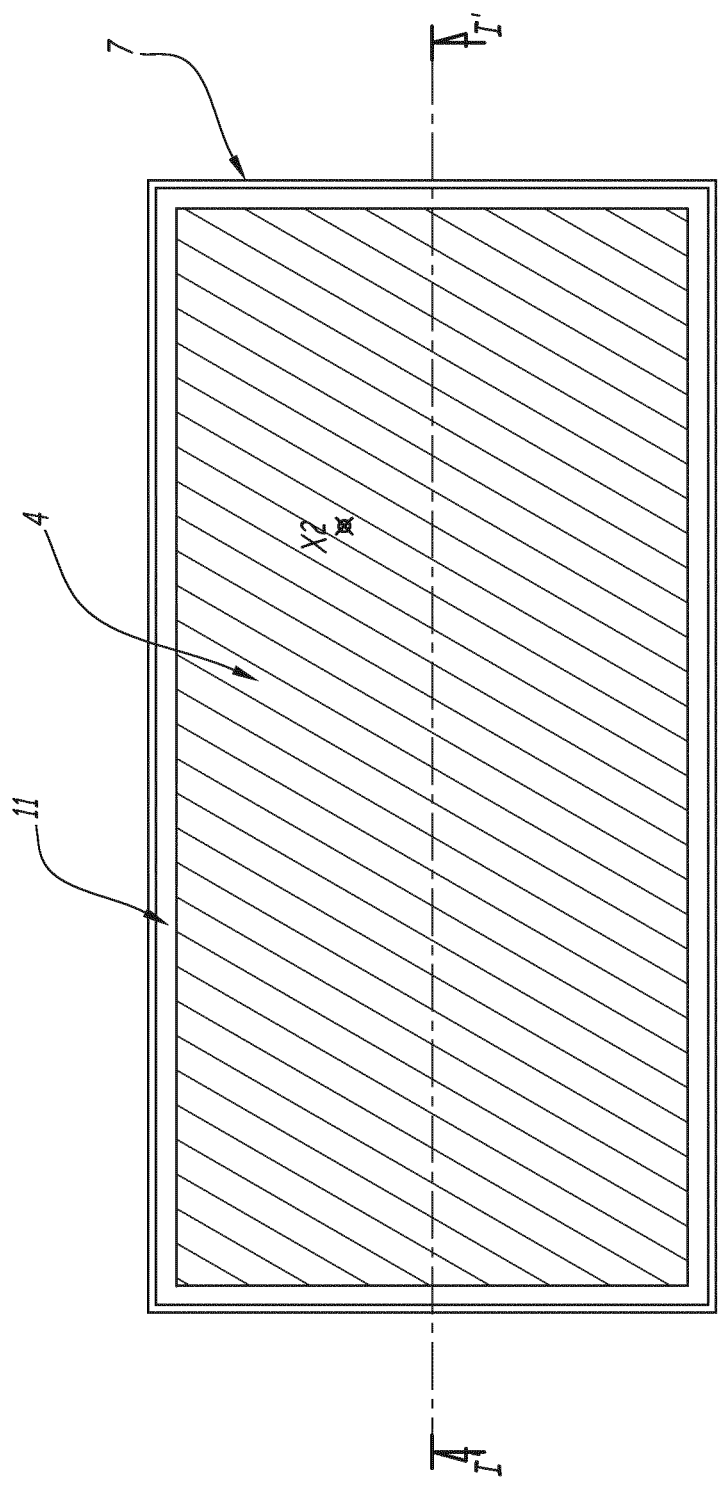
FIG. 3 is a schematic top view of the extraction device of FIGS. 1 and 2, in which the cutting line I-I' of FIGS. 1 and 2 is shown.

From the inlet 4, the aqueous solution progresses downward by gravity, through a maze 9 contained within the peripheral wall 7, along a circulation path shown symbolically by arrows A in FIG. 2. After it passes in the maze 9, the aqueous solution reaches a main outlet 5 of the device 2, positioned in the lower portion of the latter: then, at least a portion of the pollutants soluble in the aqueous solution has been extracted within the maze 9. "Maze" refers to a hollow structure, advantageously describing meanders and allowing the passage of the aqueous solution through the device 2, from the main inlet 4 to the main outlet 5.

The device 2 is preferably made up of a modular assembly of several removable modules stacked along a main axis X2 of the device 2, including:

an inlet module 11, comprising the main inlet 4 and forming the upper portion of the device 2, an outlet module 12, comprising the main outlet 5 and forming the lower portion of the device 2, six wall modules 14A, 14B, 14C, 14D, 14E and 14F, forming annular walls with a rectangular cross-section, i.e., frames, the six wall modules 14A to 14F being stacked on one another via their respective lower annular edge 18A, 18B, 18C, 18D and 18E while bearing on their respective upper annular edge 17B, 17C, 17D, 17E and 17F, to form the peripheral wall 7 together, the inlet module 11 resting on an upper annular edge 17 of the uppermost wall module 14A, and the lowermost wall module 14F resting on the outlet module 12 via a lower annular edge 18F of the module 14F, and five partition modules 16A, 16B, 16C, 16D, and 16E, which are each inserted between two successive wall modules 14A to 14F, while resting in practice on the respective upper annular edge 17B to 17F of the wall modules 14A to 14F, and which each form a rectangular plate, corresponding to that of the rectangular cross-section of the peripheral wall 7.

The maze 9 is therefore modular and can therefore be modified easily, by assembling or disassembling various removable modules of the assembly. In particular, the removable modules are assembled by stacking within the chamber 3. Based on the removable modules integrated within the modular assembly, the value of the contact time between the adsorbent agent and the aqueous solution to be treated is modified. Indeed, depending on the number and the arrangement of the removable modules assembled within the modular assembly, the path A traveled by the aqueous solution is different in terms of length and/or sinuosity. The effectiveness of the extraction of soluble substances can thus be improved by selection and assembly of the most appropriate removable modules based on the aqueous solution to be treated, and in particular the quality of this aqueous solution, the origin of this aqueous solution, its composition and/or results obtained during a test phase for the extraction of soluble substances. Furthermore, the selection and the assembly of the removable modules are advantageously done based on the volume of aqueous solution to be treated. Additionally, the selection and the assembly of the removable modules are preferably done based on the flow rate of aqueous solution intended to traverse the installation 1 and to be introduced into the device 2. The inlet module 11, visible in FIG. 3, forms a rectangular frame corresponding to the rectangular section of the wall module 14A on which it rests, and comprises an opening, which forms the main inlet 4 and extends over practically the entire rectangular cross-section of the inlet module 11. The outlet module 12 is similar to the inlet module, and comprises an opening that forms the main outlet 5.

The partition modules 16A to 16E comprise a transverse partition that is housed inside each wall module 14B to 14F so as to at least partially close off the cross-section of the wall modules 14B to 14F, and form the maze 9. In practice, the maze 9 forms six inner housings 21A, 21B, 21C, 21D, 21E and 21F, each defined by one of the wall modules 14A to 14F and by two successive modules from among the inlet module 11, the outlet module 12 and the partition modules 16A to 16F.

Figure 4:
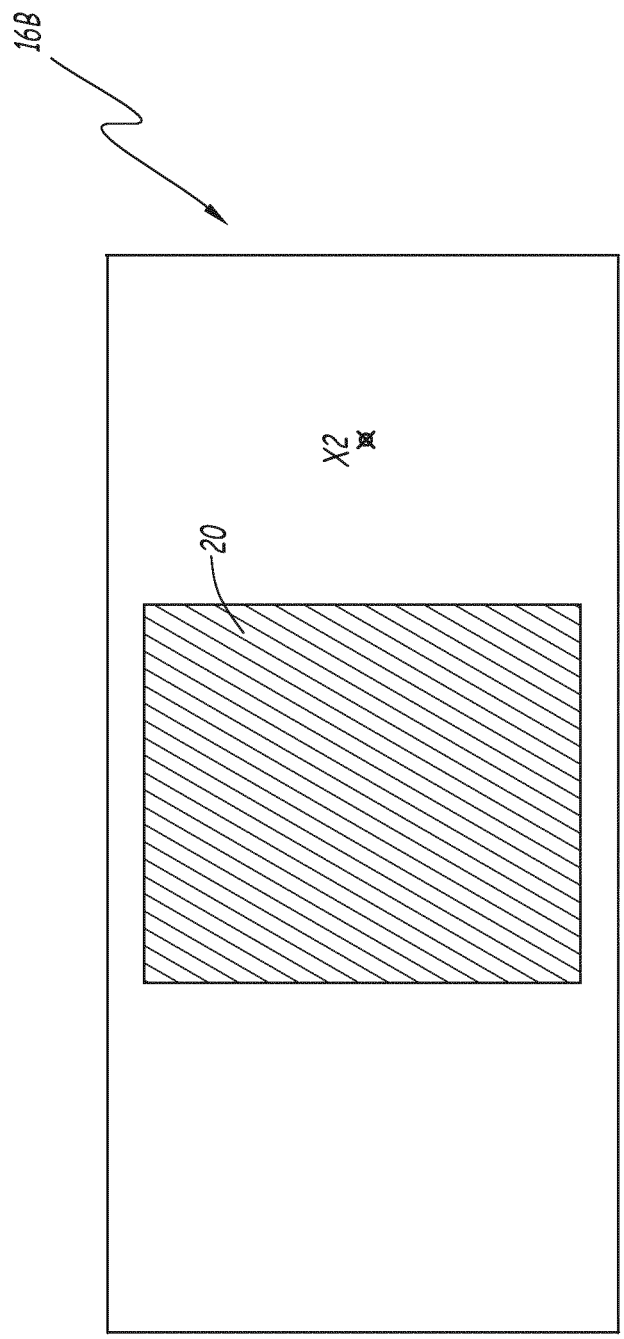
FIGS. 4 and 5 are schematic views of removable modules belonging to the extraction device of FIGS. 1 to 3.
Figure 5:
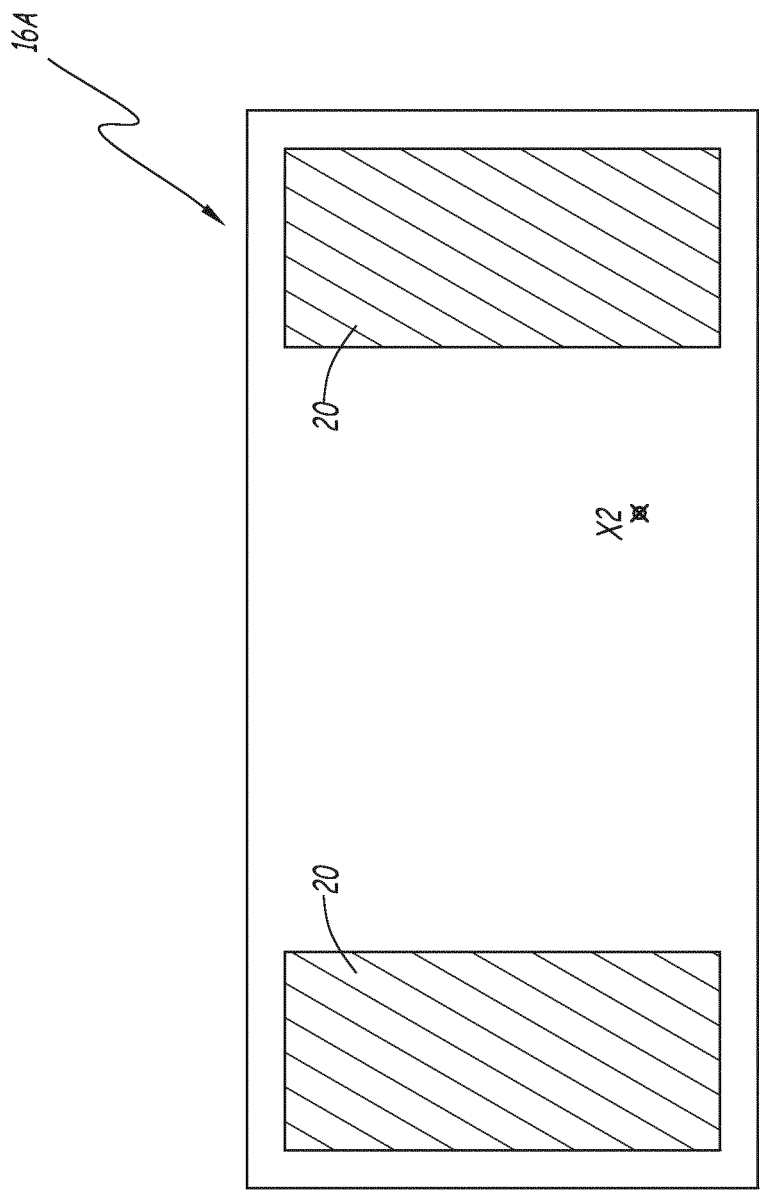

The partition modules 16A to 16E comprise at least one passage opening 20 for the aqueous solution from a first of the inner housings 21A to 21E to a successive second of the inner housings 21B to 21F. In the example of FIG. 2, the partition modules 16A, 16C and 16E comprise two passage openings 20 arranged through the transverse partition and distributed laterally behind the latter, as illustrated in FIG. 5. The partition modules 16B and 16D are in turn provided with only a single passage opening 20 positioned centrally, as visible in FIG. 4. The positioning of the passage openings 20 within the maze 9 determines the path A traveled by the aqueous solution. The passage openings 20 of the modules 16A, 16C and 16E are offset relative to those of the modules 16B and 16D, such that the maze forms a winding path A for the aqueous solution, which makes it possible to increase the residence time of said solution within the maze 9.

It is understood that the number, order and arrangement of the partition modules 16A to 16E within the modular assembly can be changed to modify the maze 9. For example, it is possible to provide a number of partition modules below six, in order for the path A to be shorter and for the contact time between the aqueous solution and the adsorbent agent to be reduced, or on the contrary greater than six, in order for the path A to be longer and the contact time between the aqueous solution and the adsorbent agent to be increased. Furthermore, it is possible to provide for assembling only partition modules according to the partition modules 16B defined above, in order for the aqueous solution to follow a straight path A. Alternatively, it is possible to provide for alternating of partition modules according to the module 16A and 16B, as illustrated in FIG. 2, in order to form a winding path A and thus to increase the contact time between the aqueous solution and the adsorbent agent. Likewise, the number of wall modules 14A to 14F can be changed, which changes the total length, measured parallel to the axis X2, of the peripheral wall 7, and therefore of the maze 9, as well as the number of partition modules that can be integrated into the modular assembly.

Preferably, sealing gaskets, not illustrated, are provided at least between the wall modules 14A to 14F, in order to guarantee the sealing and the continuity of the peripheral wall 7. Likewise, other sealing gaskets can be provided to guarantee the sealing between the inlet 11 and outlet 12 modules and the peripheral wall 7.

The device 2 also comprises an adsorbent agent, which is positioned in at least some of the inner housings 21A to 21F. An adsorbent agent in particular refers to any compound having a specific surface with a sufficient value to extract the soluble substances from the aqueous solution by contact with the latter, when it passes within the maze 9. For example, the adsorbent agent has a specific surface whose value is greater than 100 $m^2 \cdot g^{-1}$, or even exceeding 1000 $m^2 \cdot g^{-1}$. At least the majority by mass of the adsorbent agent is granular and/or powdered activated carbon. Preferably, all of the adsorbent agent is activated carbon. The activated carbon used is preferably from wood or coconut.

Thus, based on the aqueous solution to be treated, the adsorbent agent is arranged so as to fill some or all of the housings 21A to 21F. Different portions of the adsorbent agent are thus separated by the partition modules 16A to 16E. To prevent the adsorbent agent from migrating from one housing 21A to 21F to the other and outside the maze 9, each of the openings 4, 5 and 20 is advantageously concealed by a filter capable of retaining the adsorbent agent while allowing the aqueous solution to pass through the filter. "Filter" in particular refers to any perforated partition or grate able to perform this function. These filters are for example made from stainless steel, while the other elements of the modules are for example made from plastic, such as polypropylene.

To improve the effectiveness of the extraction, it is possible to provide that a portion of the adsorbent agent arranged in one of the housings 21A to 21F has a particle size that has a mean value different from another part of the adsorbent agent arranged in another of the housings 21A to 21F. For example, one of the housings 21A to 21F may contain granular activated carbon, while another of the housings may contain powdered activated carbon. The granular activated carbon for example has a mean particular size of about 300 µm, while the powdered activated carbon has a mean particle size of about 20 µm. In this case, the filters containing the powdered activated carbon have a mesh with a lower value than those that contain the granular activated carbon, each filter being able to retain the activated carbon with which it is in contact, while having the highest possible mesh value to allow the passage of the aqueous solution. For example, the filters for the powdered activated carbon have a mesh value of about 20 µm, the filters relative to the granular activated carbon having a mesh value of about 280 µm. Alternatively, a powdered activated carbon with an even smaller mean particle size can be provided, for example smaller than 15 µm, or even about 1 µm, the mesh value of the filters being adapted accordingly.

Without being bound by the theory, it has surprisingly been discovered that the simultaneous injection of the gaseous phase and the aqueous solution into the maze 9, combined with the use of the activated carbon as adsorbent agent, allows a significant improvement in the absorption of soluble pollutants on the activated carbon. With a compactness equal to that of the devices of the prior art, the device 2 makes it possible to extract, from the aqueous solution, a quantity of dissolved substances approximately five times higher, by increasing the value of the contact time between the adsorbent agent and the aqueous solution.

Consequently, the device 2 may comprise two bubblers 23 able to emit a stream of gas bubbles within the aqueous solution circulating in the maze 9, via the main outlet 5, such that the bubbles progress to the main inlet 4 along an arrow B visible in FIG. 2, countercurrent with respect to the aqueous solution. The bubbles B in practice rise into the upper reservoir 6 and escape from the upper surface of the aqueous solution contained in this reservoir 6, near the trough 8. The bubblers 23 may be able to produce "microbubbling", i.e., to produce microbubbles, which further improves the effectiveness of the extraction of the device 2. The mean nominal diameter of the microbubbles reaches a value below approximately 100 µm. In practice, it is provided that the bubbles have a mean nominal diameter comprised between about 40 µm and 2 mm. The gas of the bubbles is preferably air. Alternatively, this gas is ozone, oxygen or nitrogen.

As an example, in the case of a device 2 provided to operate with a flow rate of aqueous solution traversing the maze 9 reaching approximately 3000 L/h, the thickness of each wall module 14A to 14F, measured parallel to the axis X2 from their upper edge 17A to 17F to their lower edge 18A to 18F, measures about 50 mm, such that the thickness of each housing 21A to 21F is in practice about 40 mm. Each partition module 16A to 16E in turn measures about 270 mm wide and 570 mm long, such that each housing 21A to 21F is able to contain up to 6.156 l of adsorbent agent. The openings 4, 5 and 20 form, for each module 11, 12 and 16A to 16E, a passage section for the aqueous solution of at least 12 cm². This passage section is preferably greater than 100 cm² for each of the housings 21A to 21F in order to guarantee an optimal flow of the aqueous solution within the maze 9. The stream of bubbles is emitted by the bubblers 23 with a gas flow rate comprised between about 0 and 25 m³/h, based on the aqueous solution flow rate.

The device 2 described above makes it possible to carry out a method for extracting soluble substances dissolved in the aqueous solution within the maze 9 as described hereinafter.

This method comprises a step during which at least one of the modules 14A to 14F or 16A to 16E is assembled and/or disassembled, in order to adapt it to the aqueous solution intended to circulate in the maze, which makes it possible to obtain an optimal effectiveness of the extraction within the device 2. This step is advantageously carried out following a test step, during which the quality of the aqueous solution is tested in order to determine which module 14A to 14F or 16A to 16E to integrate into the modular assembly.

Preferably, the method further comprises, before the treatment step, a step for pre-filtration of the aqueous solution, for example using a sand filter of the installation 1, not illustrated, and/or using pre-skimming. The prefiltration step is carried out to eliminate the matter in suspension in the aqueous solution and thus to make it possible to improve the extraction of the soluble substances in the pre-filtered aqueous solution. The prefiltration step may for example be carried out under a modified atmosphere, under pressure or in a vacuum in order to optimize the result.

Preferably, the method further comprises, after the extraction step within the device 2, a step for recovering the adsorbent agent, in particular if the latter is activated carbon. This recovery step is followed by a step for regenerating the adsorbent agent. Preferably, the regenerating step is a heat treatment done at a high temperature sufficient for this regeneration, typically about 700° C. The adsorbent agent thus regenerated can be used again to line the maze 9.

Figure 6:
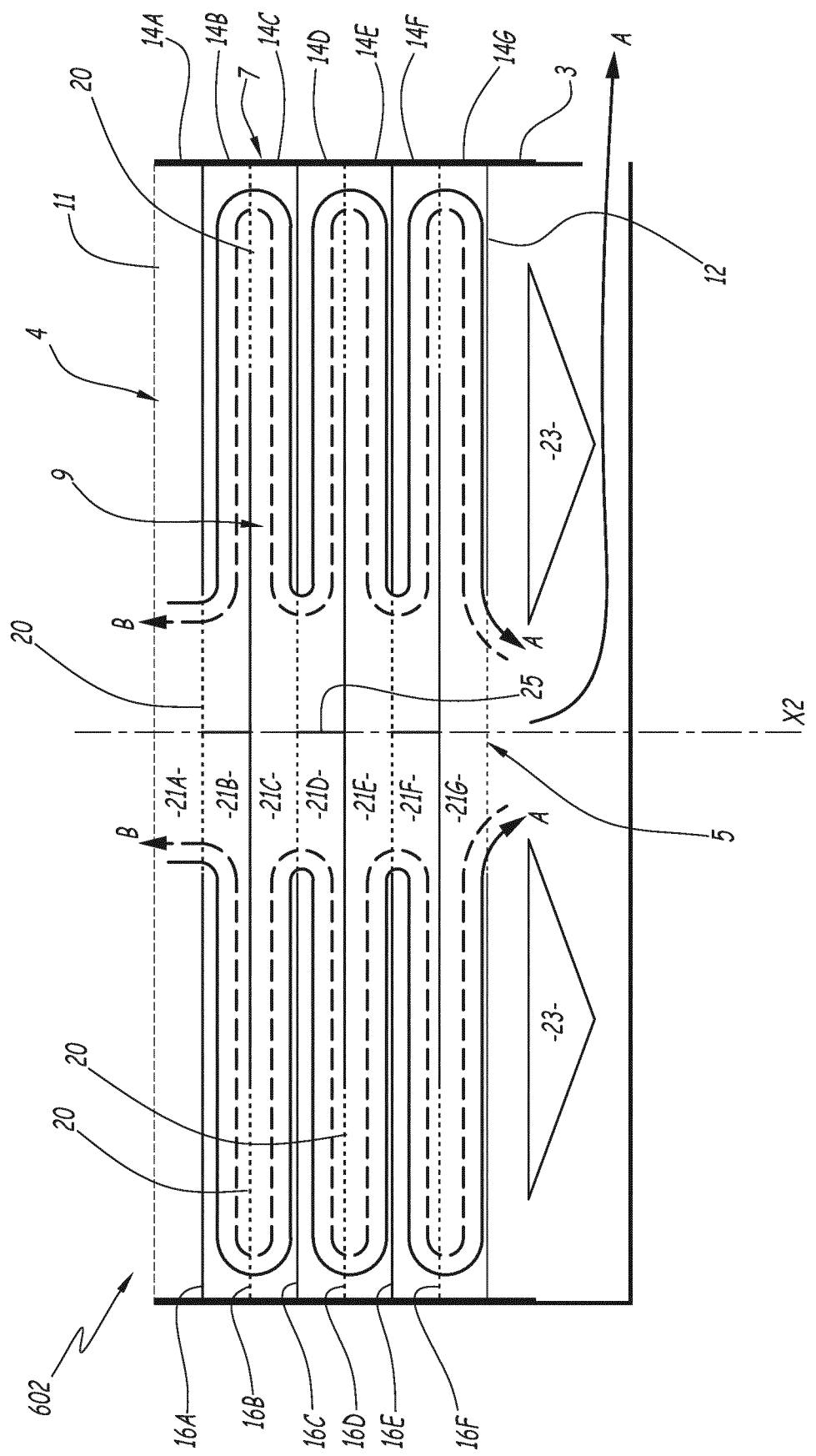
FIGS. 6 to 8 are schematic sectional views, similar to those of FIG. 2, each showing an extraction device according to one embodiment of the invention.
Figure 7:
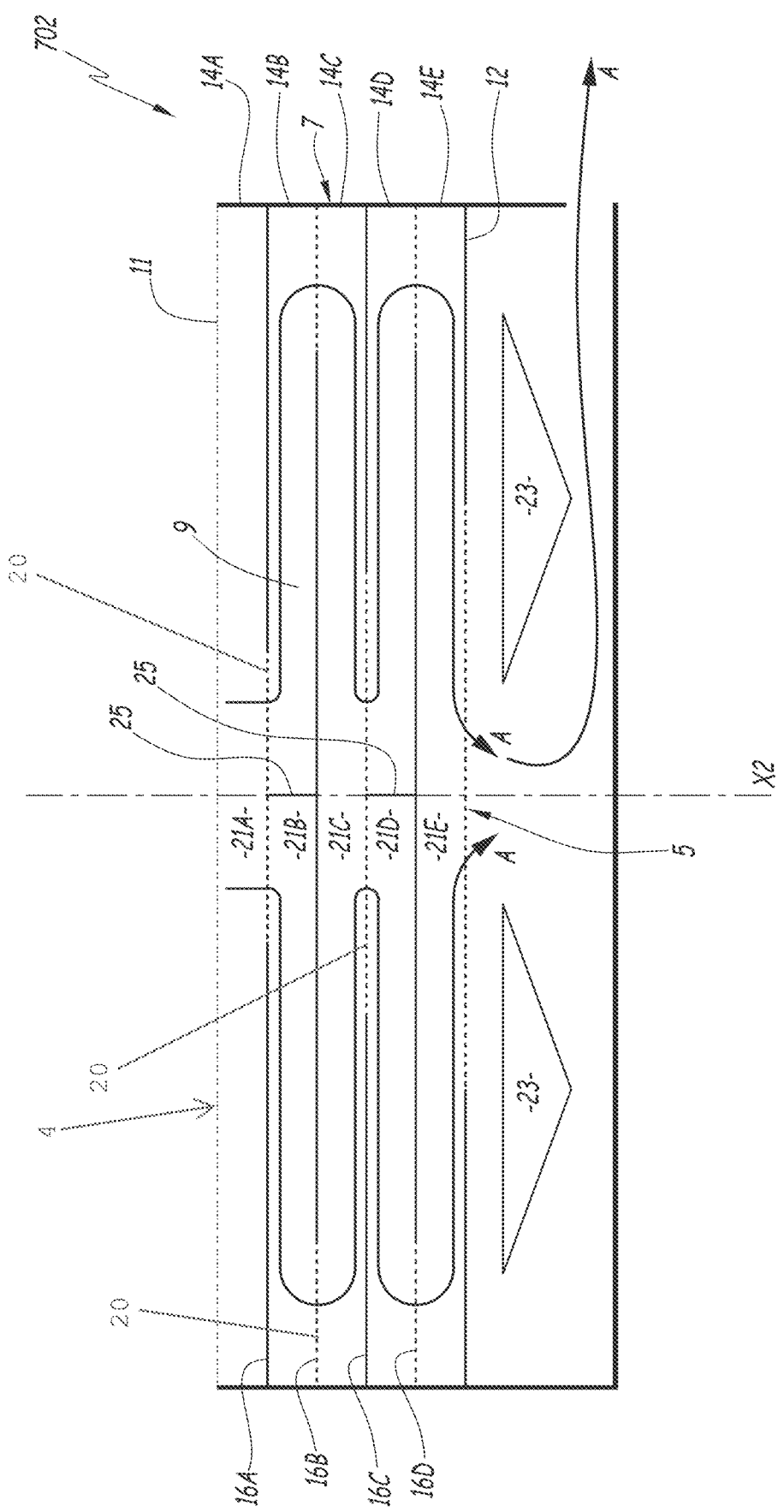
Figure 8:
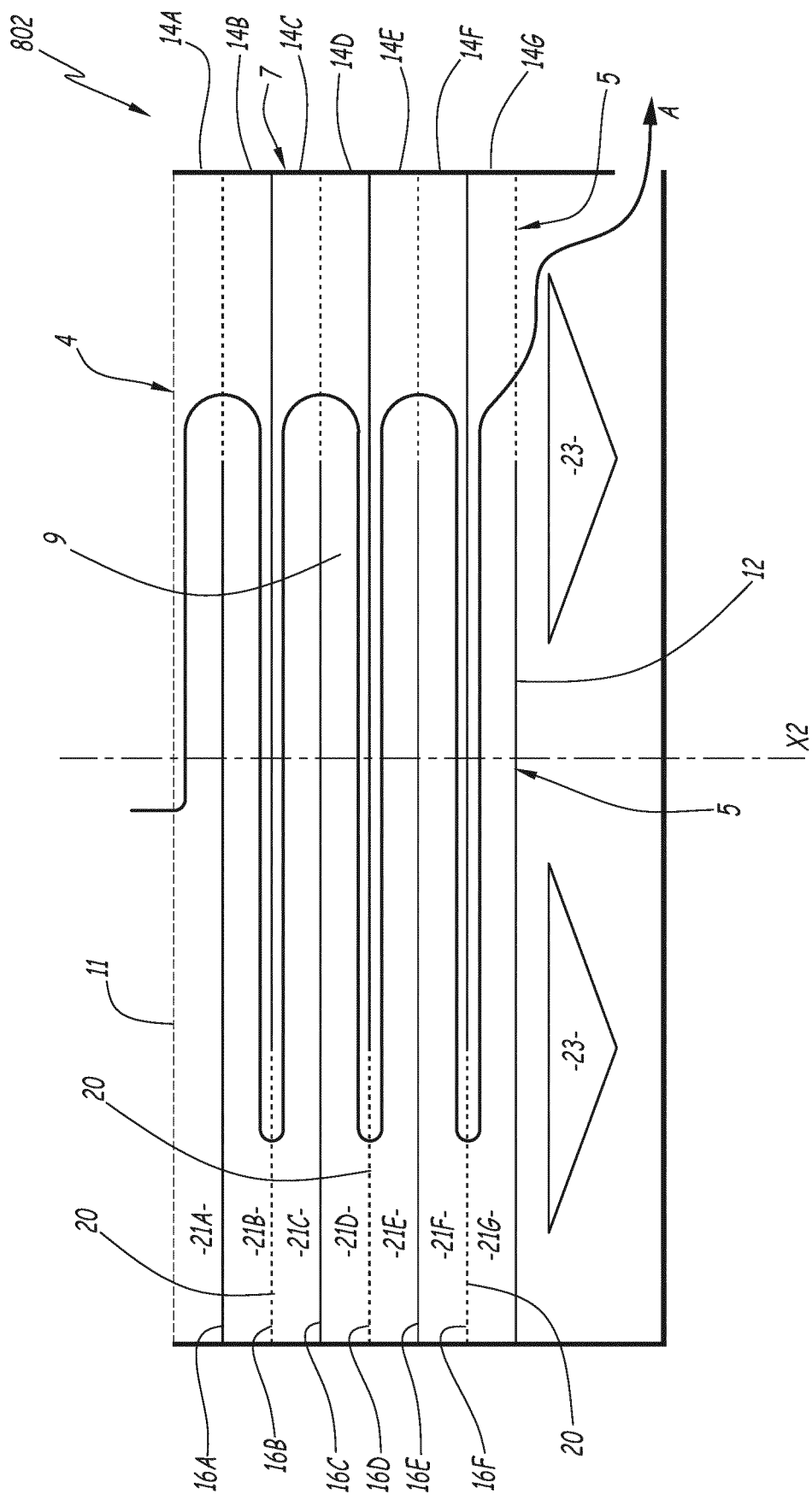

FIGS. 6, 7 and 8 respectively show the extraction devices 602, 702 and 802, according to other embodiments according to the invention, the devices 602, 702 and 802 having characteristics similar to those of the device 2 described above, and which are not described again below, and different characteristics, which will be described below. The characteristics shared by the devices 2, 602, 702 and 802 are referenced in the figures with the same reference numbers.

The device 602 of FIG. 6 comprises a main inlet 4, a main outlet 5, a peripheral wall 7, defining a main axis X2, and a maze 9 formed by a modular assembly of removable modules including seven wall modules 14A to 14G, an inlet module 11, an outlet module 12, and six partition modules 16A to 16F, to form seven inner housings 21A to 21G, at least some of which are filled with adsorbent agent. The device 602 also comprises two bubblers 23 arranged below the main outlet 5. The opening forming the main outlet 5 occupies a smaller surface than the opening forming the main inlet 4, and covers a passage surface equivalent to that of the passage openings 20 of the partition modules 16A, 16C and 16E.

The device 602 differs from the device 2 in that a median partition 25, oriented parallel to the axis X2, is arranged within the inner housings 21B, 21D and 21F, so as to respectively connect the partition module 16A with the partition module 16B, the partition module 16C with the partition module 16D, the partition module 16E with the partition module 16F, and thus to separate each of these inner housings 21B, 21D and 21F in two.

The device 702 of FIG. 7 comprises a main inlet 4, a main outlet 5, a peripheral wall 7, defining a main axis X2, and a maze 9 formed by a modular assembly of removable modules including five wall modules 14A to 14E, an inlet module 11, an outlet module 12, and four partition modules 16A to 16D, to form five inner housings 21A to 21E, at least some of which are filled with adsorbent agent. The device 702 also comprises two bubblers 23 arranged below the main outlet 5, as well as two median partitions arranged in the housings 21B and 21D.

The device 702 differs from the device 602 and the device in that the surface of the opening 20 of the partition module 16C is larger than that of the opening 20 of the partition module 16A, and that the surface of the outlet opening 5 is larger than that of the opening 20 of the partition module 16C, the surface of the outlet opening 5 nevertheless being smaller than that of the inlet opening 4.

The device 702 of FIG. 7 comprises a main inlet 4, a main outlet 5, a peripheral wall 7, defining a main axis X2, and a maze 9 formed by a modular assembly of removable modules including five wall modules 14A to 14E, an inlet module 11, an outlet module 12, and four partition modules 16A to 16D, to form five inner housings 21A to 21E, at least some of which are filled with adsorbent agent. The device 702 also comprises two bubblers 23 arranged below the main outlet 5, as well as two median partitions arranged in the housings 21B and 21D.

The device 702 differs from the device 602 and the device in that the surface of the opening 20 of the partition module 16C is larger than that of the opening 20 of the partition module 16A, and that the surface of the outlet opening 5 is larger than that of the opening 20 of the partition module 16C, the surface of the outlet opening 5 nevertheless being smaller than that of the inlet opening 4. The flow of the aqueous solution within the maze 9 is thus facilitated.

The device 802 of FIG. 8 comprises a main inlet 4, a main outlet 5, a peripheral wall 7, defining a main axis X2, and a maze 9 formed by a modular assembly of removable modules including seven wall modules 14A to 14G, an inlet module 11, an outlet module 12, and six partition modules 16A to 16F, to form seven inner housings 21A to 21G, at least some of which are filled with adsorbent agent. The device 802 also comprises two bubblers 23 arranged below the main outlet 5.

The device 802 differs from the device 2 in that each of the partition modules 16A, 16C and 16E has a single passage opening 20, which is arranged near a first end of these partition modules 16A, 16C and 16E, and which extends over only part of the transverse partition of the partition modules 16A, 16C and 16E. The outlet opening 5 and the outlet module 12 have the same characteristics as the passage openings of the partition modules 16A, 16C and 16E. The partition modules 16B, 16D and 16F have the opposite arrangement relative to the modules 12, 16A, 16C and 16E, i.e., they each have a single passage opening 20 arranged at a second end, opposite the first end, and extending over only part of the surface of the transverse partition of these partition modules 16B, 16D and 16F. The arrangement of the openings 5 and 20 within the maze 9 thus delimits a particularly winding path A, which makes it possible to increase the contact time between the aqueous solution and the adsorbent agent, relative to the case of the device 2.

Alternatively, the extraction device is arranged such that its main axis is not vertical, but inclined, or even horizontal (see FIG. 9).

In this case, the device preferably comprises a pressurizing device 24 (see FIG. 9), of the pump type, for the aqueous solution in the maze, arranged near the main inlet 4, which causes the aqueous solution to progress from the main inlet 4 toward the outlet 5 through the adsorbent agent. In this case, the bubblers 23 are preferably placed near the main inlet 4 such that the stream of bubbles is emitted from the main inlet toward the main outlet 5, co-current with respect to the aqueous solution.

Alternatively to a pressurizing device, a depressurizing device 25 can be provided near the main outlet 5 to obtain the same effect. The depressurizing device 25 is optionally provided with a gas recuperator contained in the stream of bubbles, in particular in the case where this gas is not air and is for example ozone. This gas recuperator is for example arranged at the main outlet 5. The recovered gas is next reintroduced into the stream of gas by the bubblers.

Alternatively, a single bubbler is provided, or a number of bubblers greater than two, for example four. It is understood that as many bubblers as necessary are provided in the device 2.

Alternatively, the peripheral wall has a nonrectangular section, and preferably circular, the removable modules then being adapted accordingly.

Alternatively, the maze of the extraction device delimits a helical path for the passage of the aqueous solution, from the main inlet to the main outlet. Helical means a path that forms a helix bearing around the main axis of the extraction device. The removable modules have a shape adapted accordingly.

Alternatively, a height of the extraction device, measured parallel to the axis X2 from the inlet module to the outlet module, comprises between about 20 and 100 cm.

Alternatively, the extraction device can be implemented for a home or industrial treatment installation for wastewater, supply water, or treatments for aqueous solutions other than those defined above, in all cases making it possible to extract at least a portion of the soluble substances contained in the treated aqueous solution.

The features, embodiments, alternatives and specific and preferred features described above can be combined with one another and apply to the extraction device of the invention and to the extraction method of the invention.

The invention claimed is:

1. An extraction device for extracting soluble substances dissolved in an aqueous solution, the extraction device comprising:
    a peripheral wall;
    an adsorbent agent contained in said peripheral wall, the adsorbent agent being capable of extracting at least one portion of the soluble substances by contact with the aqueous solution; and
    a maze, defining a circulation path for the aqueous solution within said peripheral wall, the maze comprising:
        a main inlet and a main outlet for the aqueous solution that are fluidly connected to one another by the circulation path, said adsorbent agent being arranged inside the maze so as to be placed in contact with the aqueous solution during the circulation of the aqueous solution along the circulation path; and
        a modular assembly of several removable modules, each removable module being able to be assembled to, or disassembled from, the modular assembly in order to modify the circulation path, comprising:
            partition modules, each partition module comprising:
                at least one transverse partition housed inside said peripheral wall when the partition module is mounted within the modular assembly, so as to at least partially close a transverse section of said peripheral wall; and
                at least one passage opening for the aqueous solution being arranged through the transverse partition, the positioning of the at least one passage opening within the maze determining the circulation path traveled by the aqueous solution; and
            wall modules, forming at least a portion of said peripheral wall when the wall modules are mounted within the modular assembly, the wall modules comprising:
                a first wall module comprising an upper annular edge; and
                a second wall module comprising a lower annular edge, wherein said first wall module and the second wall module are stacked one on another, the lower annular edge bearing on said upper annular edge.

2. The extraction device according to claim 1, wherein a passage opening of a first one of said partition modules is offset relative to a passage opening of a second partition one of said partition modules, when the first partition module and the second partition module are assembled within said modular assembly.

3. The extraction device according to claim 1, wherein each partition module is designed to be inserted between said upper and lower annular edges.

4. The device according to claim 1, wherein at least a first portion and a second portion of said adsorbent agent are separated by one of said partition modules, the first portion of said adsorbent agent having a particle size with a first mean value, and the second portion of said adsorbent agent having a particle size with a second mean value, different from the first mean value.

5. The extraction device according to claim 1, wherein at least a majority of the mass of said adsorbent agent is made up of granular and/or powdered activated carbon.

6. The extraction device according to claim 1, further comprising at least one bubbler, which is intended to generate a stream of bubbles in the aqueous solution circulating in said maze, in a circulation direction oriented from said main inlet toward said main outlet or from said main outlet toward said main inlet.

7. The extraction device according to claim 1, further comprising a pressurizing device, or a depressurizing device, for the aqueous solution in said maze.

8. The extraction device according to claim 1, wherein said partition modules and said first wall module are assembled such that an outer peripheral edge of each partition module is received within a recess formed in said upper annular edge.

9. An extraction method for extracting soluble substances dissolved in an aqueous solution comprising:
    providing the extraction device according to claim 1; and
    flowing the aqueous solution through the device to extract the soluble substances dissolved in the aqueous solution.

10. The extraction method according to claim 9, further comprising removing or adding the removable modules based on at least one of a concentration of soluble substances dissolved in the aqueous solution, a volume of aqueous solution to circulate in said maze, and a flow rate of aqueous solution to circulate in said maze.

* * * * *